US011780307B2

(12) United States Patent
Shimada et al.

(10) Patent No.: US 11,780,307 B2
(45) Date of Patent: Oct. 10, 2023

(54) SEALING MEMBER FOR VEHICLE DOOR

(71) Applicants: Nishikawa Rubber Co., Ltd., Hiroshima (JP); HONDA MOTOR CO., LTD., Tokyo (JP)

(72) Inventors: Hiroshi Shimada, Hiroshima (JP); Toshifumi Matsuura, Hiroshima (JP); Masaki Soda, Tokyo (JP)

(73) Assignees: Nishikawa Rubber Co., Ltd., Hiroshima (JP); HONDA MOTOR CO., LTD., Tokyo (JP)

( * ) Notice: Subject to any disclaimer, the term of this patent is extended or adjusted under 35 U.S.C. 154(b) by 35 days.

(21) Appl. No.: 17/470,478

(22) Filed: Sep. 9, 2021

(65) Prior Publication Data
US 2022/0080814 A1    Mar. 17, 2022

(30) Foreign Application Priority Data

Sep. 11, 2020  (JP) .................. 2020-153100

(51) Int. Cl.
*B60J 10/00* (2016.01)
*B60J 10/25* (2016.01)
*B60J 10/40* (2016.01)
*B60J 10/84* (2016.01)
*B60J 10/86* (2016.01)

(52) U.S. Cl.
CPC ............ *B60J 10/25* (2016.02); *B60J 10/40* (2016.02); *B60J 10/84* (2016.02); *B60J 10/86* (2016.02)

(58) Field of Classification Search
CPC .................... B60J 10/25; B60J 10/86
See application file for complete search history.

(56) References Cited

U.S. PATENT DOCUMENTS

| 2004/0163321 | A1* | 8/2004 | Yamaoka | B60J 10/25 49/475.1 |
| 2016/0368356 | A1* | 12/2016 | Amagai | B60J 10/86 |
| 2017/0274750 | A1* | 9/2017 | Sobue | F16J 15/027 |
| 2021/0300166 | A1* | 9/2021 | Kajita | B60J 10/25 |

FOREIGN PATENT DOCUMENTS

| JP | 59114125 | * | 7/1984 | ........... B60J 10/25 |
| JP | H04-151330 A | | 5/1992 | |
| WO | 2015/072558 A1 | | 5/2015 | |

OTHER PUBLICATIONS

English translation of JP59114125 (Year: 1984).*

* cited by examiner

*Primary Examiner* — Daniel J Troy
*Assistant Examiner* — Daniel Alvarez
(74) *Attorney, Agent, or Firm* — Renner, Otto, Boisselle & Sklar, LLP

(57) ABSTRACT

To reduce splash of water that has entered a gap between an upper end of a door and a vehicle body onto a locked portion. A part of a vertical side sealing portion 4 from a part including a water inlet 71 to at least a part above a hollow portion R3 is a die-molded portion. In the die-molded portion, a core removing hole 79 for removing a core used in molding is open at a cabin outer side relative to an attachment plate 80. A guide portion 90 for guiding water that has entered from the water inlet 71 to a cabin inner side relative to the core removing hole 79 is provided above the core removing hole 79 on the inner surface of the hollow portion R3.

6 Claims, 12 Drawing Sheets

SEALING MEMBER FOR VEHICLE DOOR

CROSS-REFERENCE TO RELATED APPLICATION

This application claims priority to Japanese Patent Application No. 2020-153100 filed on Sep. 11, 2020, the disclosure of which including the specification, the drawings, and the claims is hereby incorporated by reference in its entirety.

TECHNICAL FIELD

The present disclosure relates to a vehicle door sealing member configured to be attached to a door of a vehicle.

BACKGROUND

Doors of vehicles employed to date are provided with sealing members for sealing gaps between the doors and door openings of vehicle bodies (see, for example, Patent Documents 1 and 2). The sealing member of Patent Document 1 is elongated in the top-bottom direction, and attached to the rear end of the door. An upper end portion of the sealing member has an upper opening, and a lower end portion of the sealing member has a drain port. The sealing member has a hollow portion that is continuous from the upper opening to the drain port. This sealing member enables water that has entered a gap between the upper end of the door and the vehicle body to be introduced into the hollow portion from the upper opening of the sealing member and to be discharged from the drain port.

The sealing member of Patent Document 2 includes an attachment base to be attached to a door, and a hollow sealing portion. The sealing member includes a die-molded portion molded by a mold die configured to be opened and closed. The die-molded portion has a core removing hole for removing a core used for molding the inner surface of the hollow sealing portion during molding.

CITATION LIST

Patent Documents

Patent Document 1: International Patent Publication No. 2015/072558
Patent Document 2: Japanese Patent Publication No. H04-151330

SUMMARY OF INVENTION

Technical Problem

Below a window frame of a door, a locked portion for holding the door in a closed state is provided. If water is splashed onto the locked portion, the locked portion might fail to be unlocked when water is frozen, and/or might be rusted.

In Patent Document 1, since the upper end portion of the sealing member has an upper opening, water that has entered a gap between the upper end of the door and the vehicle body is introduced to the upper opening and guided from a hollow portion to a position below the locked portion by way of the drain port. Thus, splash of water onto the locked portion is expected to be reduced.

In Patent Document 1, however, a portion of the sealing member from the upper opening to the hollow portion has a shape difficult to be extrusion-molded, and thus, this portion has to be a die-molded portion. In molding a molded portion, since a core needs to be used, as described in Patent Document 2, a core removing hole is inevitably formed in the molded portion. Accordingly, water introduced to the upper opening unintentionally flows out from the core removing hole while flowing in the hollow portion, and as a result, water is expected to be splashed onto the locked portion.

It is therefore an object of the present disclosure to reduce splash of water that has entered to a gap between an upper end of a door and a vehicle body onto a locked portion of the door.

Solution to Problem

To achieve the object, according to a first aspect, in a vehicle door sealing member configured to be attached to a door and to seal a gap between the door and a door opening in a side portion of a vehicle body of a vehicle, the door being configured to cover and uncover the door opening, the vehicle door sealing member includes: a vertical side sealing portion including an attachment plate extending in a top-bottom direction along a vertical side of a window frame of the door and attached to the vertical side; and a peripheral wall integrally formed on the attachment plate and extending in the top-bottom direction along the vertical side of the window frame, wherein an upper portion of the vertical side sealing portion has a water inlet communicating with a hollow portion, the hollow portion being defined by the attachment plate and the peripheral wall, a lower portion of the vertical side sealing portion is located below a locked portion of the door and has a drain port communicating with the hollow portion, a part of the vertical side sealing portion from a part of the vertical side sealing portion having the water inlet to at least a part of the vertical side sealing portion above the hollow portion is a die-molded portion, the die-molded portion has a core removing hole that is open at a cabin outer side relative to the attachment plate, the core removing hole being used for removing a core used in molding, and a guide portion is disposed above the core removing hole on an inner surface of the die-molded portion, the guide portion being configured to guide water that has flowed from the water inlet toward a cabin inner side relative to the core removing hole.

For example, when the door is closed, water might enter a gap between the upper end of the door and the vehicle body. Water that has entered flows into the hollow portion from the water inlet of the vertical side sealing portion and flows downward, and is discharged from the drain port located below the locked portion of the door. Thus, water is less likely to be splashed onto the locked portion.

Water that has entered from the water inlet is guided by the guide portion located above the core removing hole toward the cabin inner side relative to the core removing hole. Thus, water is less likely to flow toward the core removing hole, and an outflow from the core removing hole can be reduced. This can also reduce splash of water onto the locked portion.

In a second aspect, the guide portion may be integrally molded with a cabin outer side portion on the inner surface of the die-molded portion, and has a plate shape extending toward the cabin inner side.

With this configuration, when water flows from the water inlet, water reaches the upper surface of the guide portion. Since the guide portion extends toward the cabin inner side, water that has reached the upper surface of the guide portion is reliably guided toward the cabin inner side. Thus, the effect of reduction of outflow from the core removing hole can be further enhanced.

In a third aspect, the guide portion may also extend in a vehicle front-rear direction, a projection projecting upward and extending in the vehicle front-rear direction may be disposed on an end portion of the guide portion at the cabin inner side, and an end portion of the projection at a vehicle rear side may be separated from the inner surface of the die-molded portion.

With this configuration, water that has reached the upper surface of the guide portion is guided in the vehicle front-rear direction by the projection serving as a so-called bank. Since the end of the projection at the vehicle rear side is separated from the inner surface of the hollow portion, water flows from behind the projection toward the vehicle inner side relative to the core removing hole, and is less likely to reach the core removing hole.

According to a fourth aspect, in a vehicle door sealing member configured to be attached to a door and to seal a gap between the door and a door opening in a side portion of a vehicle body of a vehicle, the door being configured to cover and uncover the door opening, the vehicle door sealing member includes: a vertical side sealing portion including an attachment plate extending in a top-bottom direction along a vertical side of a window frame of the door and attached to the vertical side; and a peripheral wall integrally formed on the attachment plate and extending in the top-bottom direction along the vertical side of the window frame, wherein an upper portion of the vertical side sealing portion has a water inlet communicating with a hollow portion, the hollow portion being defined by the attachment plate and the peripheral wall, a lower portion of the vertical side sealing portion is located below a locked portion of the door and has a drain port communicating with the hollow portion, a part of the vertical side sealing portion from a part of the vertical side sealing portion having the water inlet to at least a part of the vertical side sealing portion above the hollow portion is a die-molded portion, the die-molded portion has a core removing hole that is open at a cabin outer side relative to the attachment plate, the core removing hole being used for removing a core used in molding, and a rib extending from a position above the core removing hole to a position below an upper end of the core removing hole is disposed on an inner surface of the die-molded portion, and is configured to guide water that has flowed from the water inlet to a cabin inner side relative to the core removing hole is disposed.

For example, when the door is closed, water might enter a gap between the upper end of the door and the vehicle body. Water that has entered flows into the hollow portion from the water inlet of the vertical side sealing portion and flows downward, and is discharged from the drain port located below the locked portion of the door. Thus, water is less likely to be splashed onto the locked portion.

Water that has entered from the water inlet is guided by the rib toward the cabin inner side relative to the core removing hole. Thus, water is less likely to flow toward the core removing hole, and an outflow from the core removing hole can be reduced. This can also reduce splash of water onto the locked portion.

In a fifth aspect, an upper end of the rib may be located at a cabin outer side inside the die-molded portion.

With this configuration, water that has flows from the water inlet to the cabin outer side is guided by the rib toward the cabin inner side, and thus, is less likely to reach the core removing hole.

In a sixth aspect, the core removing hole may have a slit shape elongated in a top-bottom direction, and a portion of the rib below an upper end of the core removing hole may extend in the top-bottom direction along the core removing hole at a cabin inner side relative to the core removing hole.

With this configuration, in a case where the core removing hole has a slit shape elongated in the top-bottom direction, a water outflow from the entire region of the core removing hole from the upper side to the lower side thereof can be reduced.

In a second aspect, the vehicle door sealing member may include an upper side sealing portion extending in a vehicle front-rear direction along an upper side of the window frame, the vertical side sealing portion may be integrally molded with a vehicle rear end portion of the upper side sealing portion, the upper side sealing portion may include an outer sealing lip and an inner sealing lip, the outer sealing lip being disposed at a cabin outer side, extending in the vehicle front-rear direction, and being configured to be brought into elastic contact with the vehicle body when the door is closed, the inner sealing lip being disposed away from the outer sealing lip toward a cabin inner side, extending in the vehicle front-rear direction, and being configured to be brought into elastic contact with the vehicle body when the door is closed, a water guide groove may be disposed between the outer sealing lip and the inner sealing lip such that water that has entered from a gap between the outer sealing lip and the vehicle body is distributable toward a vehicle rear side, and the water inlet may communicate with a vehicle rear side of the water guide groove.

With this configuration, when the door is closed, the outer sealing lip and the inner sealing lip of the upper side sealing portion are brought into elastic contact with the vehicle body. At this time, since the outer sealing lip and the inner sealing lip are separated from each other in the cabin inner-outer direction to be easily deformed, a reaction force exerted on the door at the moment when the door is closed is smaller than that in a case where a sealing member having a hollow structure is brought into elastic contact. As a result, high door closability can be obtained.

In addition, when the door is closed, although the outer sealing lip and the inner sealing lip of the upper side sealing portion are brought into elastic contact with the vehicle body, water might enter from a gap between the upper end of the door and the vehicle body. The water that has entered the gap flows toward the rear of the vehicle in the water guide groove between the outer sealing lip and the inner sealing lip. Water that has flowed to the rear end of the vehicle is allowed to be discharged from the water inlet formed in the upper portion of the vertical side sealing portion.

Advantages of Invention

As described above, according to this aspect, water that has entered a gap between the upper end of a door and a vehicle body is guided to a position below a locked portion of the door. Thus, it is possible to reduce splash of water onto the locked portion of the door.

DETAILED DESCRIPTION

An embodiment of the present disclosure will be described in detail with reference to the drawings. The following embodiment is merely a preferred example in nature, and is not intended to limit the invention, applications, and use of the applications.

Figure 1:
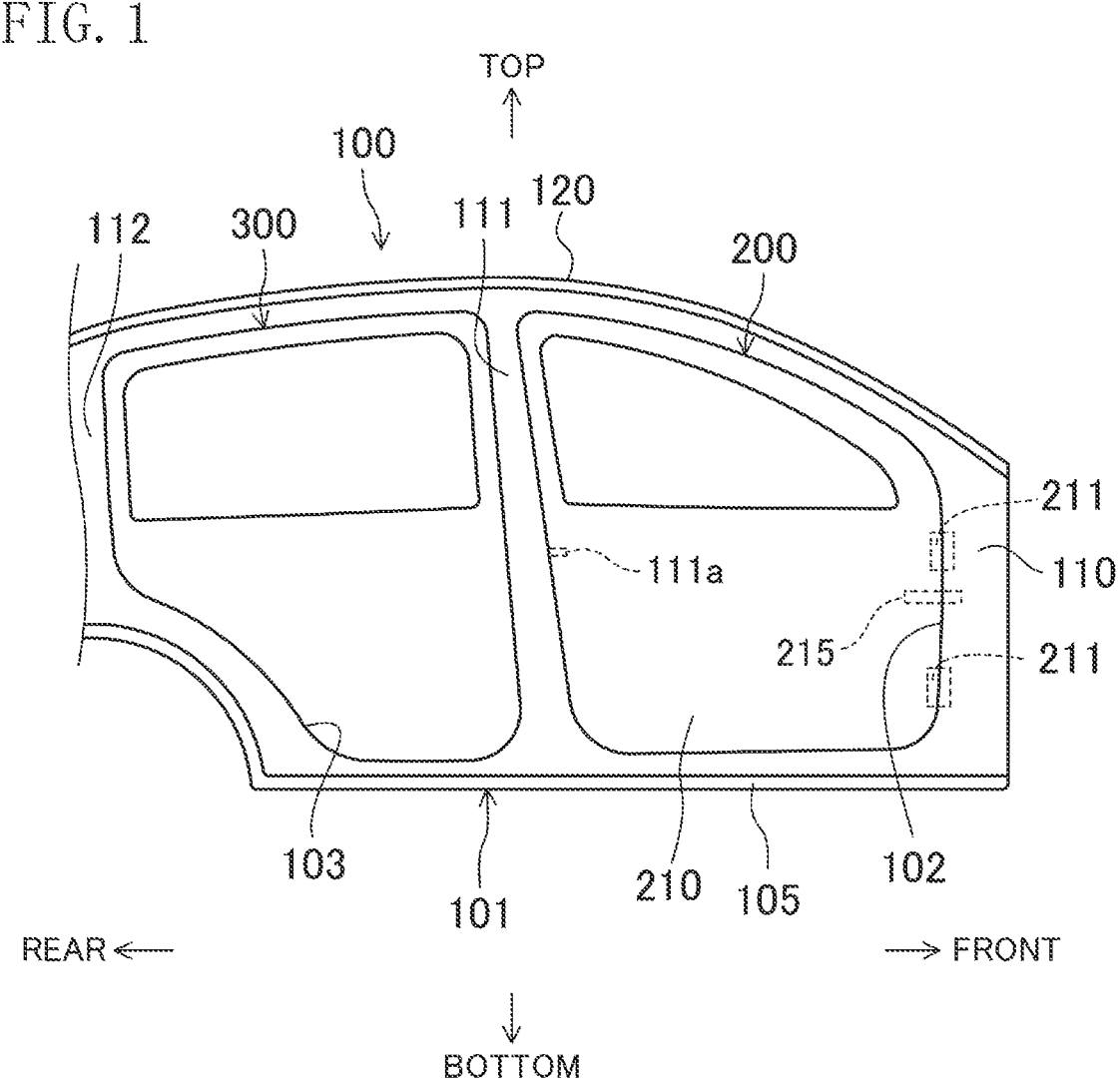
FIG. 1 is a right side view illustrating a part of a vehicle body of a vehicle according to an embodiment of the present disclosure.

FIG. 1 is a right side view illustrating a part of a vehicle body 101 of a vehicle 100 according to an embodiment of the present disclosure. A vehicle 100 is an automobile, and has a driver's sheet, a passenger's seat, and a rear sheet in a cabin. In description of this embodiment, the front side of the vehicle will be simply referred to as a front, and the rear side of the vehicle will be simply referred to as a rear.

(Configuration of Vehicle Body 101)

A right side sill 105 extends in the front-rear direction in a right lower portion of the vehicle body 101. In a right side portion of the vehicle body 101, a right front pillar 110, a right center pillar 111, and a right rear pillar 112 extend upward from the right side sill 105. In an upper portion of the vehicle body 101, a roof portion 120 extends from the upper end of the right front pillar 110 to the upper end of the right rear pillar 112 by way of the upper end of the right center pillar 111. In this configuration, a front door opening 102 is defined by the right side sill 105, the right front pillar 110, the right center pillar 111, and the roof portion 120 at the front side of the right side portion of the vehicle body 101. A rear door opening 103 is defined by the right side sill 105, the right center pillar 111, the right rear pillar 112, and the roof portion 120 at the rear side of the right side portion of the vehicle body 101. The front door opening 102 is covered and uncovered by a front door 200 illustrated in FIG. 2, and the rear door opening 103 is covered and uncovered by a rear door 300 illustrated in FIG. 1.

On the front face of the right center pillar 111, a striker 111a projects forward from an intermediate portion in the top-bottom direction. The striker 111a is a member for holding the front door 200 in a closed state, which will be described later.

The left side of the vehicle body 101 has a configuration similar to that of the right side, and the present disclosure is applicable to either the right side or the left side of the vehicle body 101. A case where the present disclosure is applied to the right side of the vehicle body 101 will now be described. The present disclosure is also applicable to the rear door 300.

(Configuration of Front Door 200)

Figure 2:
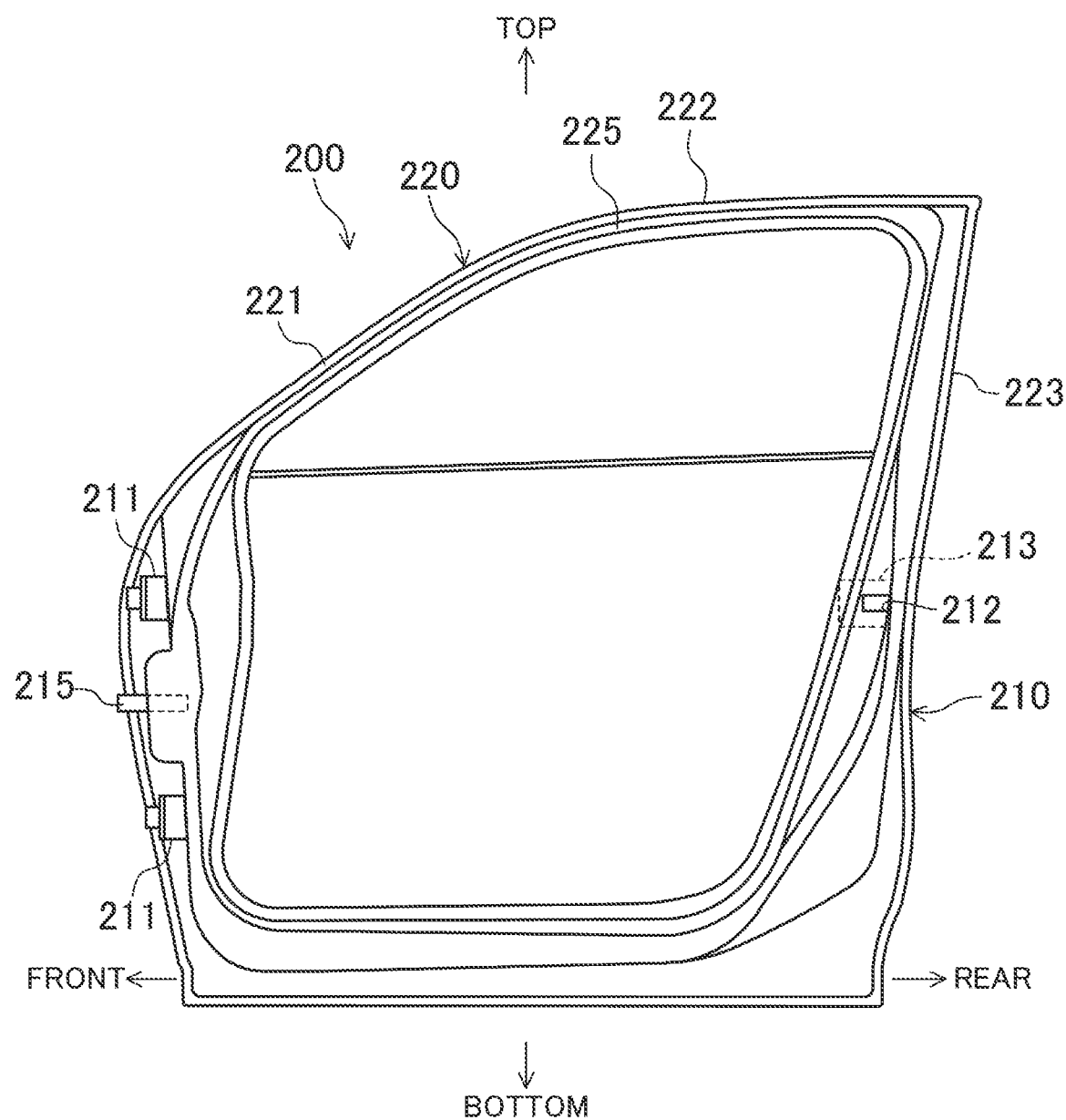
FIG. 2 is a side view of a right front door to be attached to the vehicle body, when seen from a cabin inner side.

As illustrated in FIG. 2, the front door 200 includes a door body 210 constituting a substantially lower half of the front door 200, a window frame 220 constituting substantially an upper half of the front door 200, and a window pane (not shown) held by the window frame 220. In the following description, the window frame 220 will be referred to simply as the frame 220.

Front door hinges 211 are attached to the front end of the front door body 210. A front door checker 215 is attached between the front door hinges 211 and 211 at the front end of the front door body 210. The front door hinges 211 and the front door checker 215 have structures known to date. In FIG. 2, a door trim and other members are not shown.

On the other hand, the rear end of the door body 210 has a striker hole 212 in which the striker 111a of the vehicle body 101 is fitted when the front door 200 is closed. A door latch device 213 as a locked portion is provided inside the door body 210. The door latch device 213 is a device that is engaged with the striker 111a in the striker hole 212 to hold the front door 200 in the closed state when the front door 200 becomes closed, and the door latch device 213 has a structure known to date.

The frame 220 includes a front side 221 extending upward and obliquely rearward from a front portion of the door body 210, an upper side 222, and a vertical side 223. The upper side 222 extends in the front-rear direction, and the front end of the upper side 222 is continuous to the upper end of the front side 221. The vertical side 223 extends upward from a rear portion of the door body 210, and the upper end of the vertical side 223 is continuous to the rear end of the upper side 222.

Figure 8:
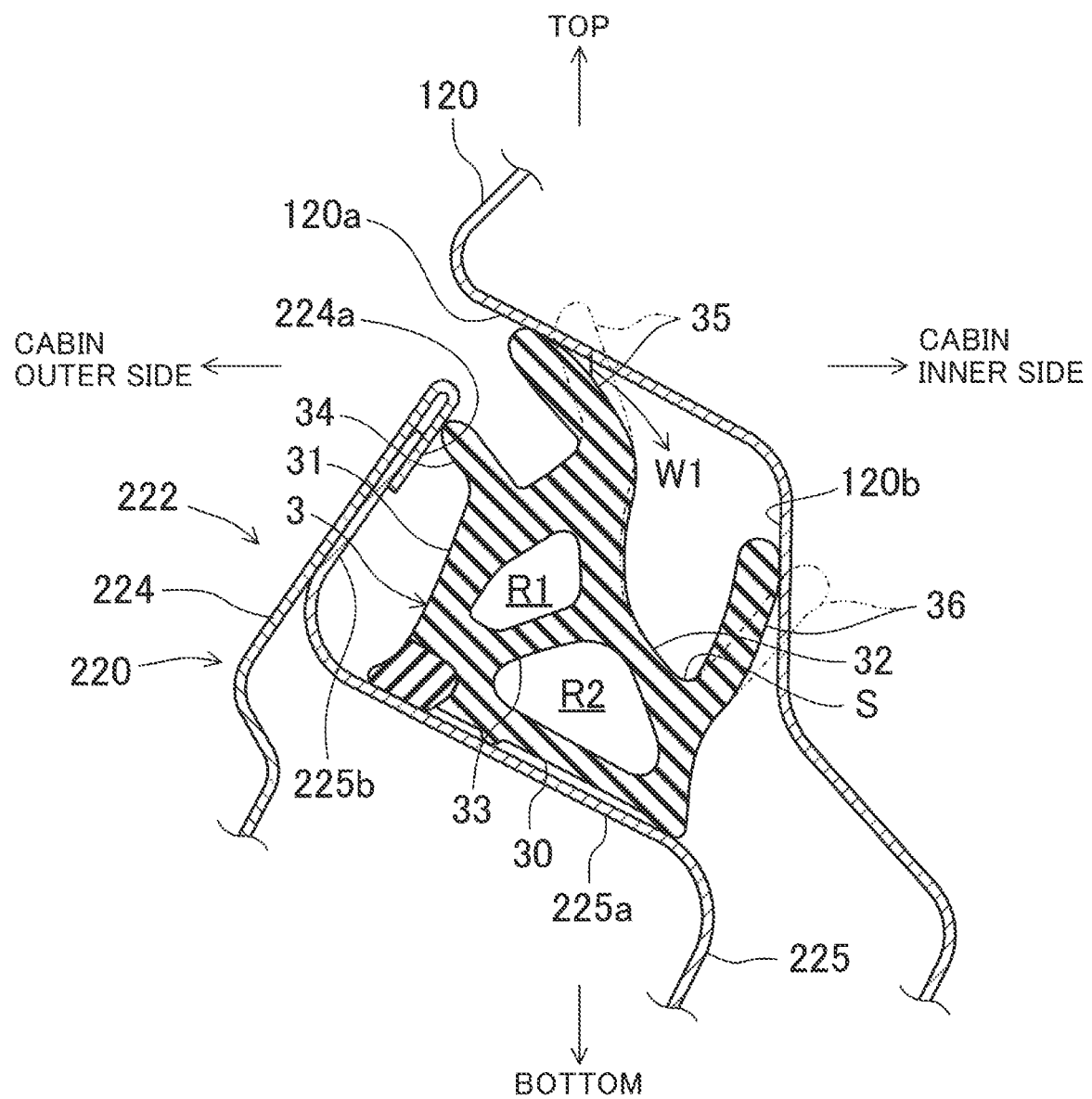
FIG. 8 is a cross-sectional view taken along line VIII-VIII in FIG. 5.
Figure 9:
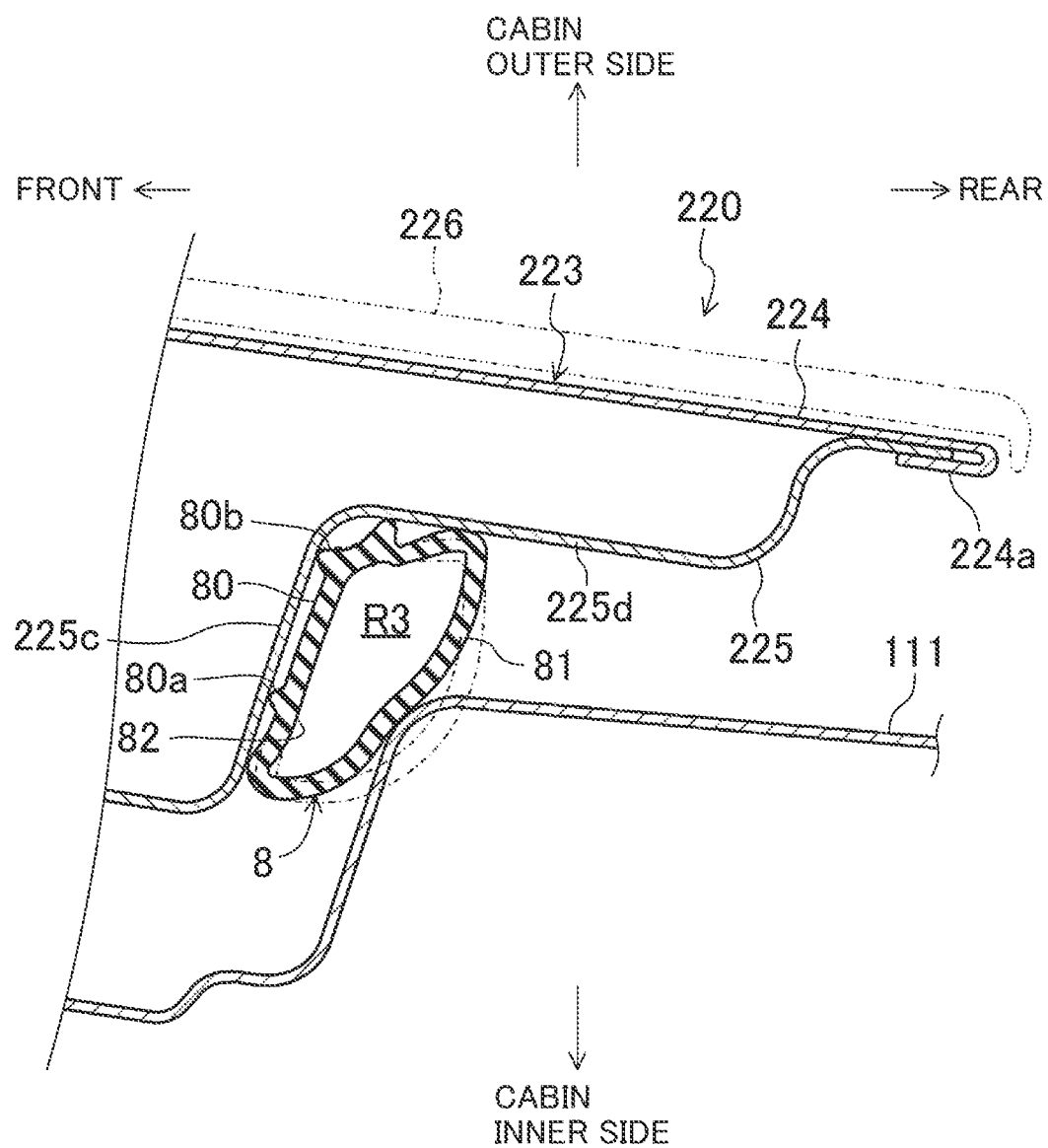
FIG. 9 is a cross-sectional view taken along line IX-IX in FIG. 5.

As illustrated in FIGS. 8 and 9, the frame 220 includes an outer panel 224 located at the cabin outer side and an inner panel 225 located at the cabin inner side. As illustrated in FIG. 8, an upper side sealing member attachment plate 225a extends toward the outer panel 224 in an upper portion of the inner panel 225, an inner panel upper plate 225b is bent upward from a portion near the outer panel 224, and the inner panel upper plate 225b overlaps with the cabin inner surface of the outer panel 224. A bent portion 224a is bent toward the cabin inner side at the upper rim of the outer panel 224, and overlaps with the cabin inner surface of the inner panel upper plate 225b. The upper side sealing member attachment plate 225a tilts to rise toward the cabin outer side.

As illustrated in FIG. 9, the inner panel 225 constituting the vertical side 223 of the frame 220 includes a vertical side sealing member attachment plate 225c extending in the cabin inner-outer direction. A rear plate 225d is bent from the cabin outer end of the vertical side sealing member attachment plate 225c and extends rearward.

Figure 10:
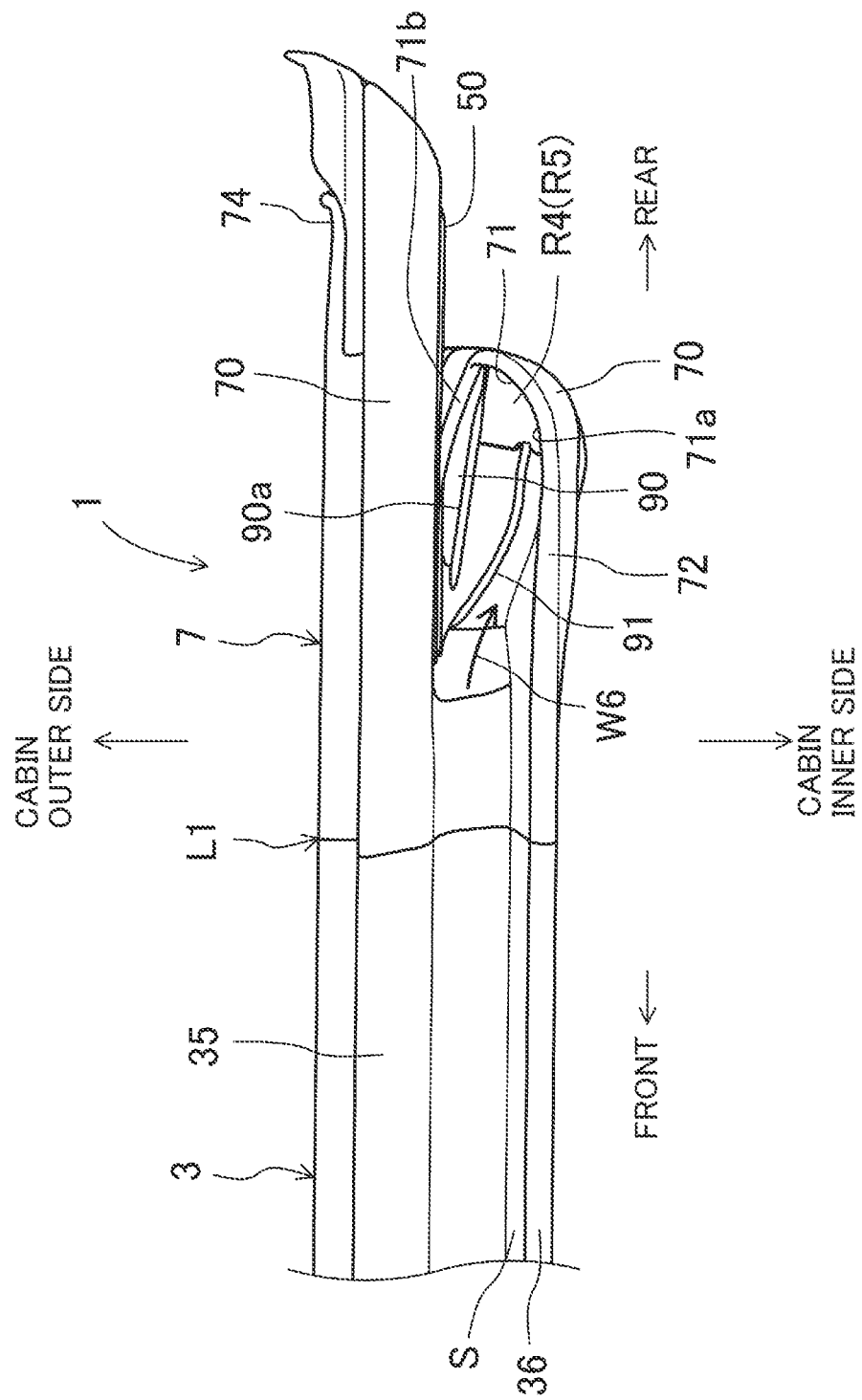
FIG. 10 is a view of a rear side of the vehicle door sealing member, when seen from above.

In addition, as illustrated by an imaginary line in FIG. 10, a garnish 226 extending in the top-bottom direction is attached to the cabin outer side of the outer panel 224 constituting the vertical side 223.

(Configuration of Vehicle Door Sealing Member 1)

Figure 5:
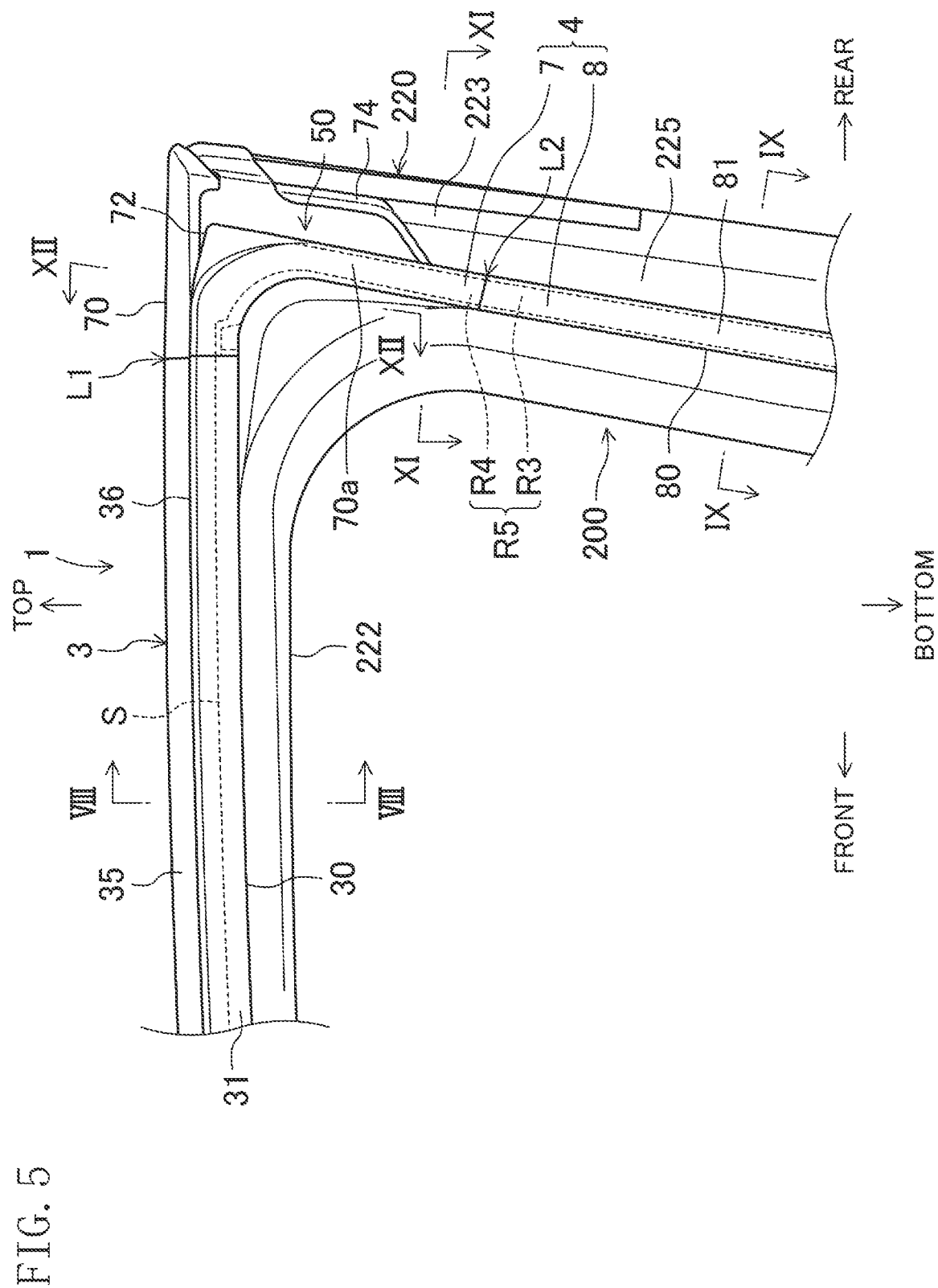
FIG. 5 is a side view of an upper portion and a rear side of the right front door to which the vehicle door sealing member is attached, when seen from the cabin inner side.

As partially illustrated in FIG. 5, the vehicle door sealing member 1 is attached to the front door 200 to seal a gap between the front door 200 and the front door opening 102.

Figure 3:
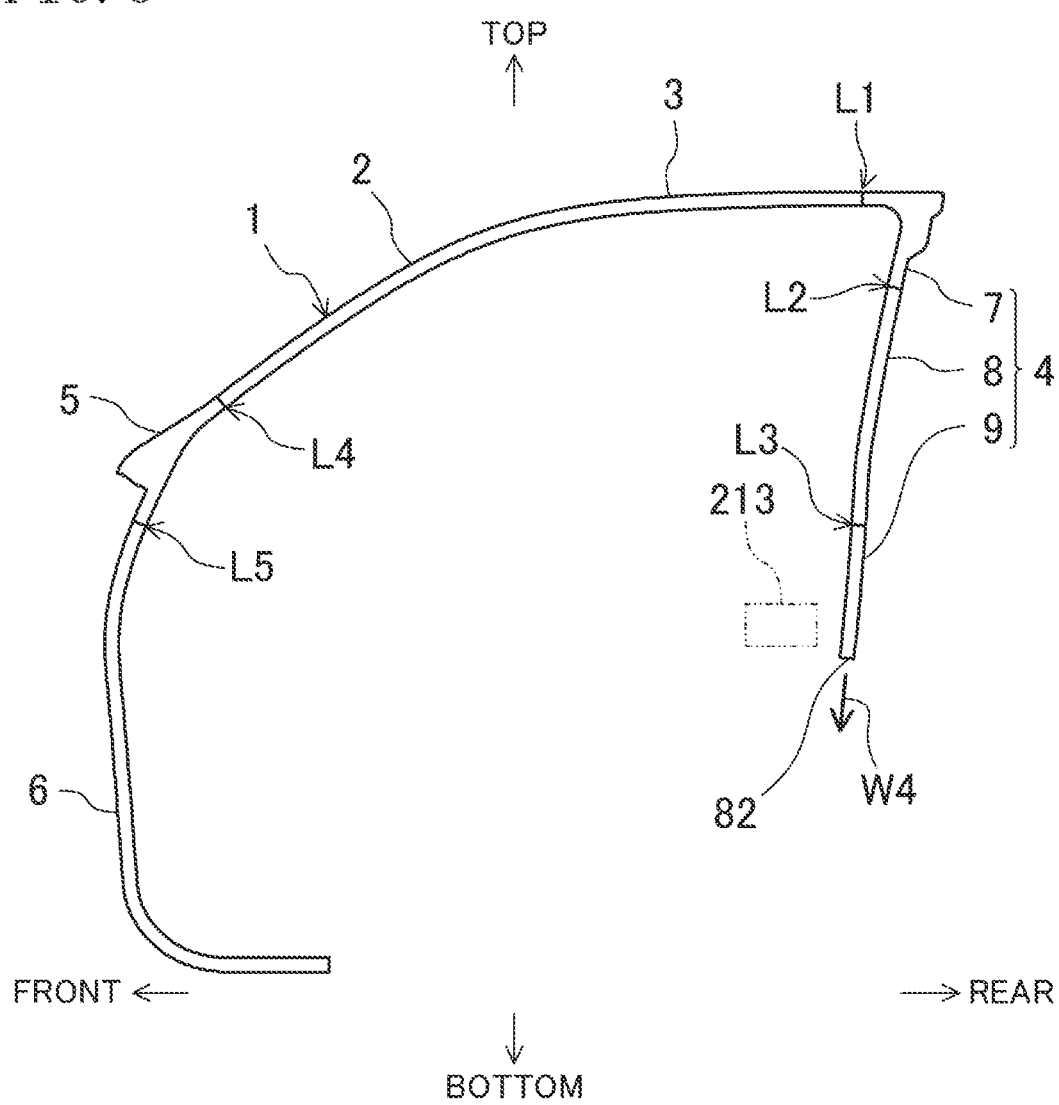
FIG. 3 is a side view of a vehicle door sealing member to be attached to the right front door, when seen from the cabin inner side.

As illustrated in FIG. 3, the vehicle door sealing member 1 includes a front side sealing portion 2 extending along the front side 221 of the frame 220, an upper side sealing portion 3 extending in the front-rear direction along the upper side 222 of the frame 220, a vertical side sealing portion 4 extending downward along the vertical side 223 of the frame 220, a front die-molded portion 5, and a lower sealing portion 6. The front side sealing portion 2 and the upper side sealing portion 3 are extrusion-molded portions integrally molded by extruding a material from an extrusion die (not shown), and has the same cross section from the front end to the rear end. The lower sealing portion 6 extends downward along the front end of the door body 210, and extends to an intermediate portion in the front-rear direction along the lower end of the door body 210. This lower sealing portion 6 is also an extrusion-molded portion. The front die-molded portion 5 is a part connecting the front end of the front side sealing portion 2 and the upper end of the lower sealing portion 6, and molded with a mold die (not shown) configured to open and close.

Here, a boundary between the lower sealing portion 6 and the front die-molded portion 5 is indicated by L5, and a boundary between the front die-molded portion 5 and the front side sealing portion 2 is indicated by L4. Any rubber-like elastic material may be used as a material applicable as the front side sealing portion 2, the upper side sealing portion 3, the vertical side sealing portion 4, the front die-molded portion 5, and the lower sealing portion 6. In the case of rubber, EPDM sponge rubber is preferable. In the case of a thermoplastic resin, foaming TPO or a soft TPO is preferable.

The front side sealing portion 2, the front die-molded portion 5, and the lower sealing portion 6 are not necessary in the present disclosure, and may be omitted.

The vertical side sealing portion 4 includes the rear die-molded portion 7 molded with a mold die (not shown) configured to open and close, a rear extrusion-molded portion 8 molded by extruding a material from an extrusion die (not shown), and a lower die-molded portion 9 molded with a mold die (not shown) configured to open and close. The rear die-molded portion 7 is formed to match with the boundary between the upper side 222 of the frame 220 and the vertical side 223. A front portion of the rear die-molded portion 7 is connected to a rear end portion of the upper side sealing portion 3. The rear extrusion-molded portion 8 extends in the top-bottom direction along the vertical side 223 of the frame 220. An upper portion of the rear extrusion-molded portion 8 is connected to a lower portion of the rear die-molded portion 7. After the upper side sealing portion 3 and the rear extrusion-molded portion 8 have been individually formed, the upper side sealing portion 3 and the rear extrusion-molded portion 8 are held in mold dies for molding the rear die-molded portion 7, and then a material for the rear die-molded portion 7 is injected into the mold dies for molding. Accordingly, the upper side sealing portion 3, the rear extrusion-molded portion 8, and the rear die-molded portion 7 can be integrally molded.

Subsequently, after the rear extrusion-molded portion 8 is held in a mold die for molding the lower die-molded portion 9, a material for the lower die-molded portion 9 is injected into the mold die to be molded. Accordingly, the rear extrusion-molded portion 8 and the rear die-molded portion 9 can be integrally molded.

Here, a boundary between the upper side sealing portion 3 and the rear die-molded portion 7 is indicated by L1, a boundary between the rear die-molded portion 7 and the rear extrusion-molded portion 8 is indicated by L2, and a boundary between the rear extrusion-molded portion 8 and the lower die-molded portion 9 is indicated by L3.

The vertical side sealing portion 4 in this embodiment is constituted by the rear die-molded portion 7, the rear extrusion-molded portion 8, and the lower die-molded portion 9. The rear extrusion-molded portion 8 and the lower die-molded portion 9 are, however, not necessary in the present disclosure, and the vertical side sealing portion 4 may be constituted only by the rear die-molded portion 7, or may be constituted only by the rear die-molded portion 7 and the rear extrusion-molded portion 8.

FIG. 8 is a view illustrating a cross section and an attachment structure of the upper side sealing portion 3. The upper side sealing portion 3 includes an attachment base 30 to be attached to the upper side 222 of the frame 220. The attachment base 30 has a plate shape extending in the front-rear direction along the upper side sealing member attachment plate 225a, and is fixed to the upper side sealing member attachment plate 225a with, for example, an unillustrated clip or the like. An outer wall 31 is formed at the cabin outer side of the attachment base 30 to extend upward and also extend in the front-rear direction. An inner wall 32 is formed at the cabin inner side of the attachment base 30 to extend upward, to the cabin outer side, and in the front-rear direction. The upper end of the outer wall 31 is continuous to the upper end of the inner wall 32. In addition, the upper side sealing portion 3 has an inclined wall 33 extending from a vicinity of the lower end of the outer wall 31 to an interim portion of the inner wall 32 in the top-bottom direction, and also extending in the front-rear direction. The attachment base 30, the outer wall 31, the inner wall 32, and the inclined wall 33 form upper space R1 and lower space R2 extending in the front-rear direction.

The upper end of the outer wall 31 is provided with a back face sealing lip 34 that projects obliquely upward toward the cabin outer side. The back face sealing lip 34 is in elastic contact with the bent portion 224a of the outer panel 224 from the inside with the upper side sealing portion 3 being attached to the upper side sealing member attachment plate 225a.

The upper side sealing portion 3 includes an extruded portion outer sealing lip 35 disposed at the cabin outer side, and an extruded portion inner sealing lip 36 disposed away from the extruded portion outer sealing lip 35 toward the cabin inner side. The extruded portion outer sealing lip 35 projects upward from a vicinity of the upper ends of the outer wall 31 and the inner wall 32 and extends in the front-rear direction. The extruded portion outer sealing lip 35 is brought into elastic contact with the roof portion 120 when the front door 200 is closed. While the front door 200 is open, the extruded portion outer sealing lip 35 has a shape extending upward as indicated by an imaginary line, whereas when being brought into elastic contact with the roof portion 120 at closure of the front door 200, the extruded portion outer sealing lip 35 is pushed downward by an outer contact surface 120a of the roof portion 120 extending in the cabin inner-outer direction to be elastically deformed and is warped downward.

The extruded portion inner sealing lip 36 projects upward from an intermediate portion of the inner wall 32 in the top-bottom direction and extends in the front-rear direction. The extruded portion inner sealing lip 36 is brought into elastic contact with the roof portion 120 when the front door 200 is closed. While the front door 200 is open, the extruded portion inner sealing lip 36 has a shape extending toward the cabin inner side as indicated by an imaginary line. On the other hand, when the extruded portion inner sealing lip 36 is brought into elastic contact with the roof portion 120 in closing the front door 200, the extruded portion inner sealing lip 36 is pushed to the cabin outer side by an inner contact surface 120*b* of the roof portion 120 extending in the top-bottom direction to be elastically deformed.

A water guide groove S is formed between the extruded portion outer sealing lip 35 and the extruded portion inner sealing lip 36. Since the extruded portion outer sealing lip 35 and the extruded portion inner sealing lip 36 extend in the front-rear direction, the water guide groove S is also constituted by a groove elongated in the front-rear direction. While the front door 200 is closed, the extruded portion outer sealing lip 35 is in elastic contact with the roof portion 120, but external water might enter a gap between the extruded portion outer sealing lip 35 and the outer contact surface 120*a* of the roof portion 120. That is, when water enters a gap between the upper end of the front door 200 and the roof portion 120, this water flows into the water guide groove S. Water that has flowed into the water guide groove S is allowed to be distributed in the front-rear direction.

FIG. 9 is a view illustrating a cross section and an attachment structure of the rear extrusion-molded portion 8. The rear extrusion-molded portion 8 includes an attachment plate 80 to be attached to the vertical side 223 of the frame 220. The attachment plate 80 has a plate shape also extending in the top-bottom direction along the vertical side sealing member attachment plate 225*c* and extending in the cabin inner-outer direction. The attachment plate 80 is fixed to the vertical side sealing member attachment plate 225*c* with, for example, an unillustrated clip. An inner bead 80*a* and an outer bead 80*b* are provided on a front face of the attachment plate 80. The inner bead 80*a* is located at the cabin inner side of the attachment plate 80, and continuously extends in the top-bottom direction. The outer bead 80*b* is located at the cabin outer side of the attachment plate 80, and continuously extends in the top-bottom direction. The inner bead 80*a* and the outer bead 80*b* is brought into elastic contact with the vertical side sealing member attachment plate 225*c* to be deformed to thereby obtaining a sealing property.

The rear extrusion-molded portion 8 has a peripheral wall 81 extending from the cabin outer edge of the attachment plate 80 to the cabin inner edge thereof and protruding rearward. The peripheral wall 81 is elongated in the top-bottom direction, and when the front door 200 is closed, the peripheral wall 81 is brought into elastic contact with the right center pillar 111 and is thereby become a shape slightly recessed relative to the center pillar 111.

A hollow portion R3 (which will be described later in detail) is defined by the attachment plate 80 and the peripheral wall 81 inside the rear extrusion-molded portion 8. The length of the vertical side sealing portion 4 is set such that in a state where the vehicle door sealing member 1 is attached to the front door 200, a lower portion of the vertical side sealing portion 4 extends below the door latch device 213 as illustrated in FIG. 3. A lower portion of the vertical side sealing portion 4 has a drain port 82 communicating with a lower end portion of the hollow portion R3. The drain port 82 is open downward.

Figure 7:
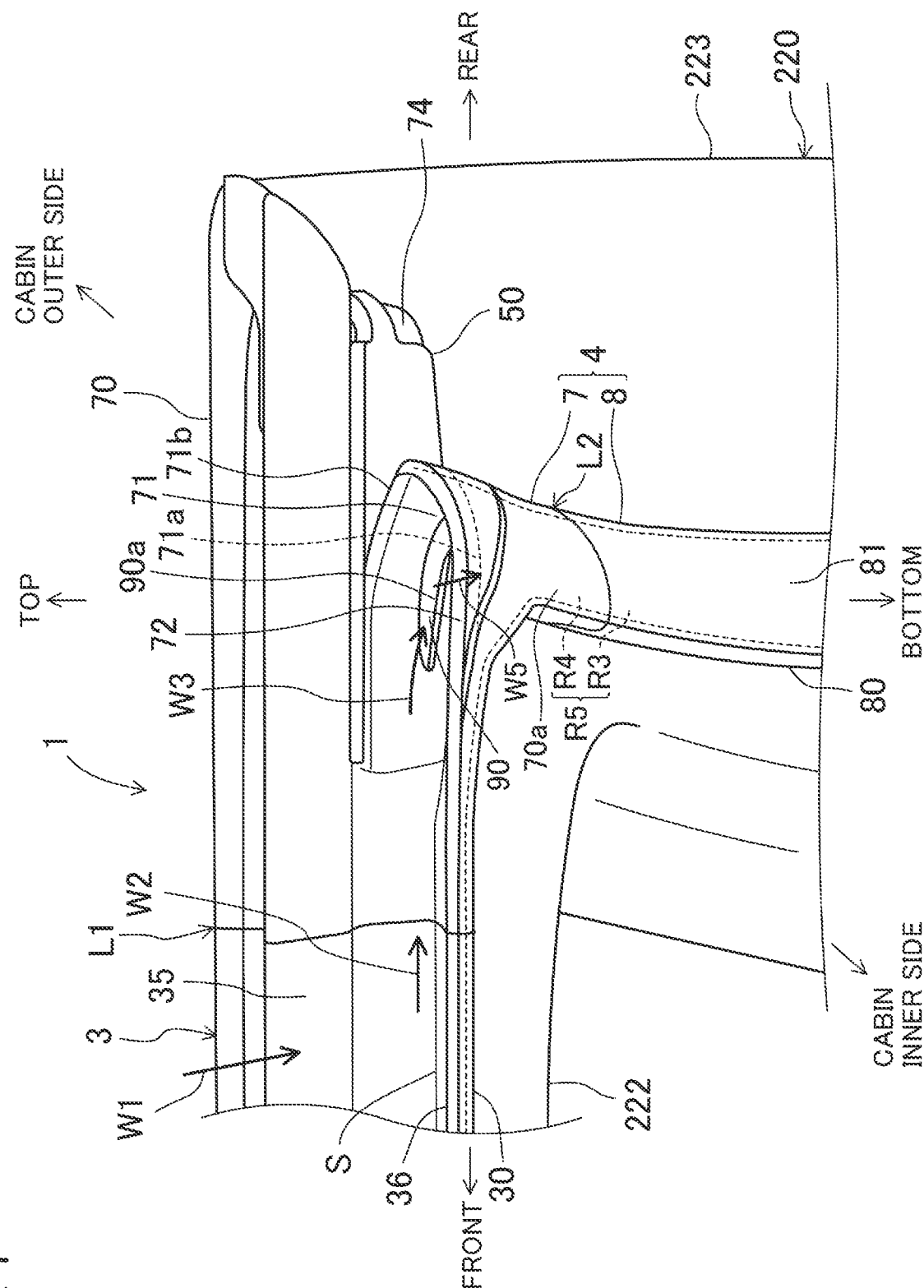
FIG. 7 is a perspective view of an upper portion and a rear side of the right front door to which the vehicle door sealing member is attached, when seen obliquely from above from the cabin inner side.

As illustrated in FIG. 7, a die-molded portion outer sealing lip 70 projects upward and extending in the front-rear direction at the cabin outer side of the rear die-molded portion 7. The front end of the die-molded portion outer sealing lip 70 is continuous to the rear end of the extruded portion outer sealing lip 35 of the upper side sealing portion 3. The die-molded portion outer sealing lip 70 is brought into elastic contact with the roof portion 120, when the front door 200 is closed.

A cylinder portion 70*a* extends in the top-bottom direction at the cabin inner side of the rear die-molded portion 7. The lower end of the cylinder portion 70*a* is continuous to the upper ends of the attachment plate 80 and the peripheral wall 81 of the rear extrusion-molded portion 8. Accordingly, an inner space R4 of the cylinder portion 70*a* and the hollow portion R3 of the rear extrusion-molded portion 8 communicate with each other so that one drain channel R5 extending in the top-bottom direction is formed inside the vertical side sealing portion 4. The lower end of the drain channel R5 communicates with the drain port 82 (shown in FIG. 4), and the upper end of the drain channel R5 communicates with a water inlet 71 illustrated in FIG. 7. Thus, the drain channel R5 continuously extends from the water inlet 71 to the drain port 82.

That is, the water inlet 71 is formed in an upper portion of the rear die-molded portion 7, and this water inlet 71 communicates with the rear end of the water guide groove S. The water inlet 71 is open upward and elongated in the front-rear direction. The water inlet 71 is located at the cabin inner side of the die-molded portion outer sealing lip 70 and near the lower end of the die-molded portion outer sealing lip 70. Since the water guide groove S is located ahead of the water inlet 71, when water in the water guide groove S flows rearward, water flows into the water inlet 71 from a front portion of the water inlet 71.

A cabin inner edge 71*a* and a cabin outer edge 71*b* of the water inlet 71 both extend in the front-rear direction. The cabin inner edge 71*a* of the water inlet 71 has an inner plate portion 72 extending upward and in the front-rear direction. The front end of the inner plate portion 72 is continuous to the rear end of the extruded portion inner sealing lip 36 of the upper side sealing portion 3. Thus, water in the water guide groove S does not flow over the cabin inner edge 71*a* of the water inlet 71, and can be guided into the water inlet 71 by the inner plate portion 72.

Figure 4:
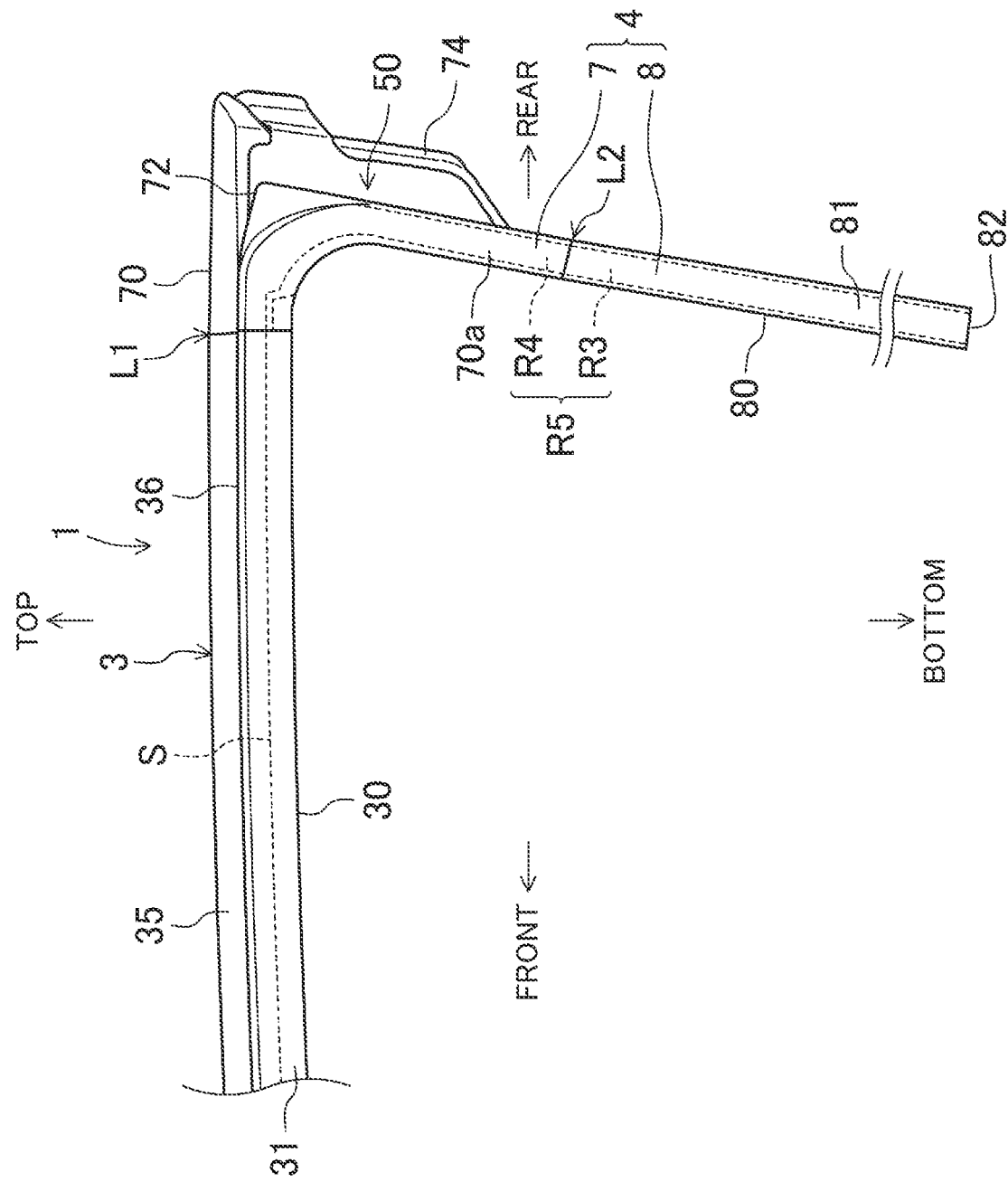
FIG. 4 is a side view of an upper portion and a rear side of the vehicle door sealing member, when seen from the cabin inner side.

As illustrated in FIG. 4, the rear die-molded portion 7 is provided with the extension plate 74 extending rearward. An outsert member (hard plate member) 50 of a material harder than a material constituting the vertical side sealing portion 4 overlaps with the cabin inner side of the extension plate 74. Examples of the material for the outsert member 50 includes a material that is less easily deformed than a material constituting the rear die-molded portion 7, such as a polyacetal resin.

Figure 6:
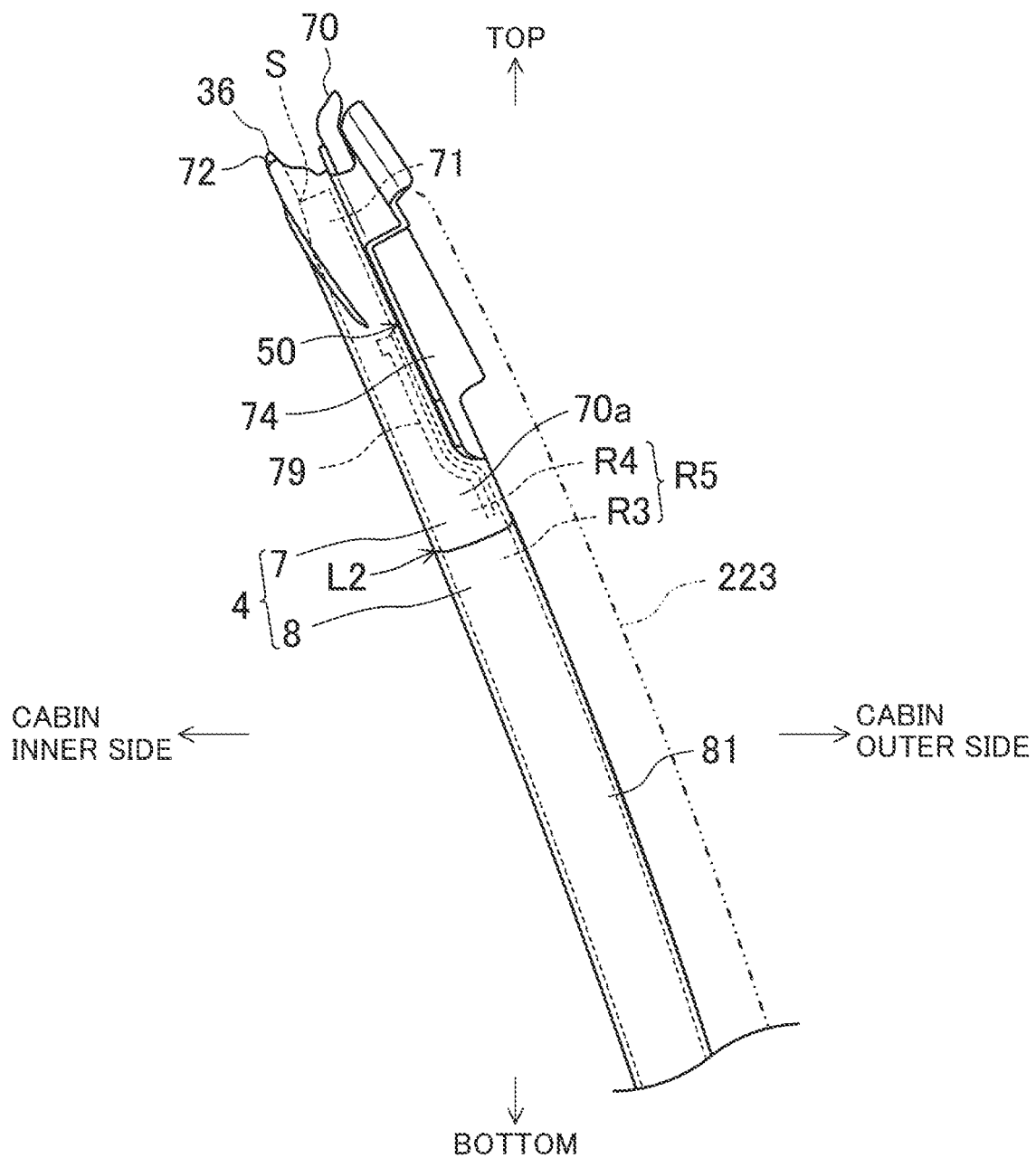
FIG. 6 is a view of an upper portion of the vehicle door sealing member attached to a window frame, when seen from a vehicle rear side.
Figure 11:
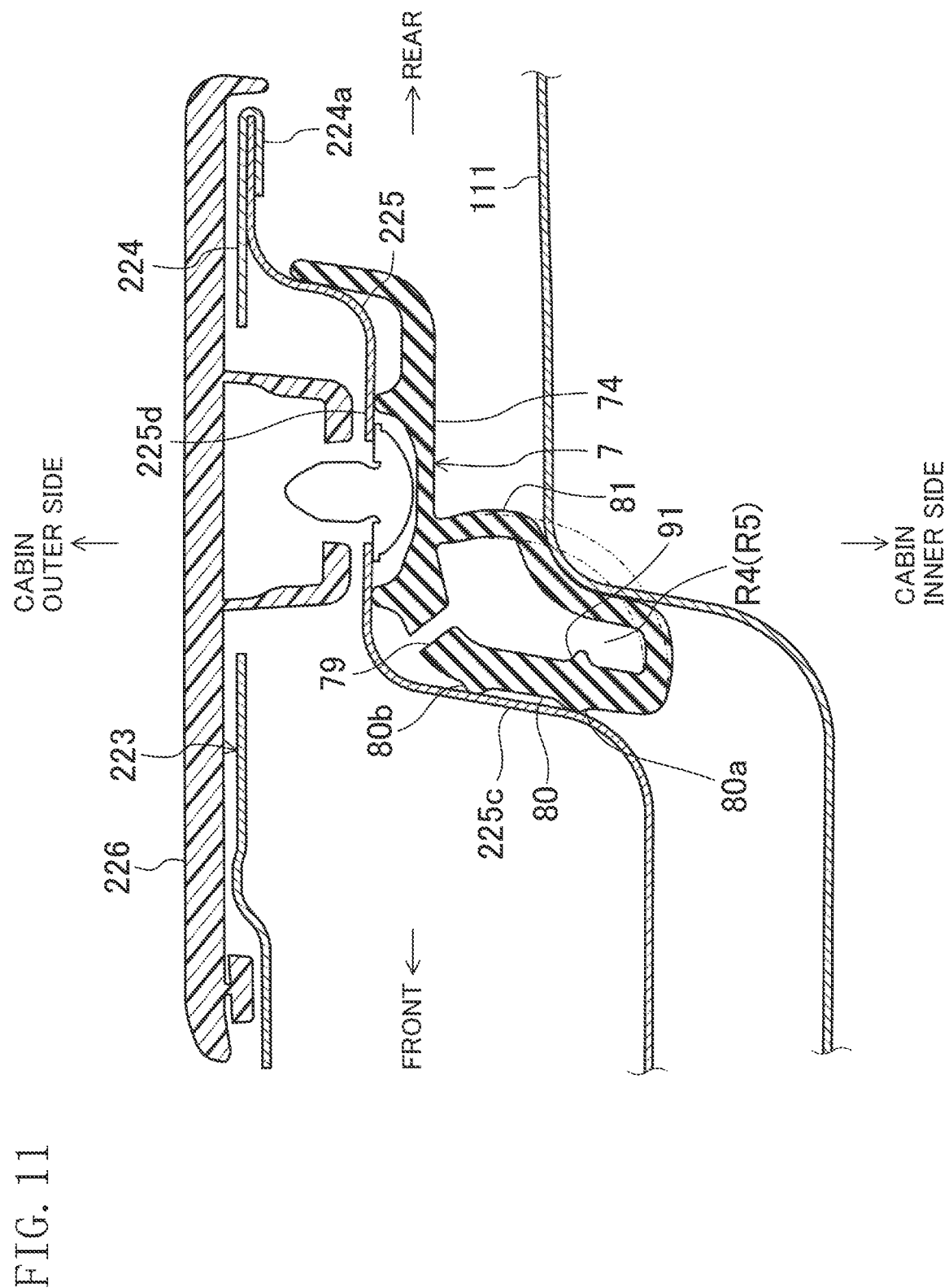
FIG. 11 is a cross-sectional view taken along line XI-XI in FIG. 5.
Figure 12:
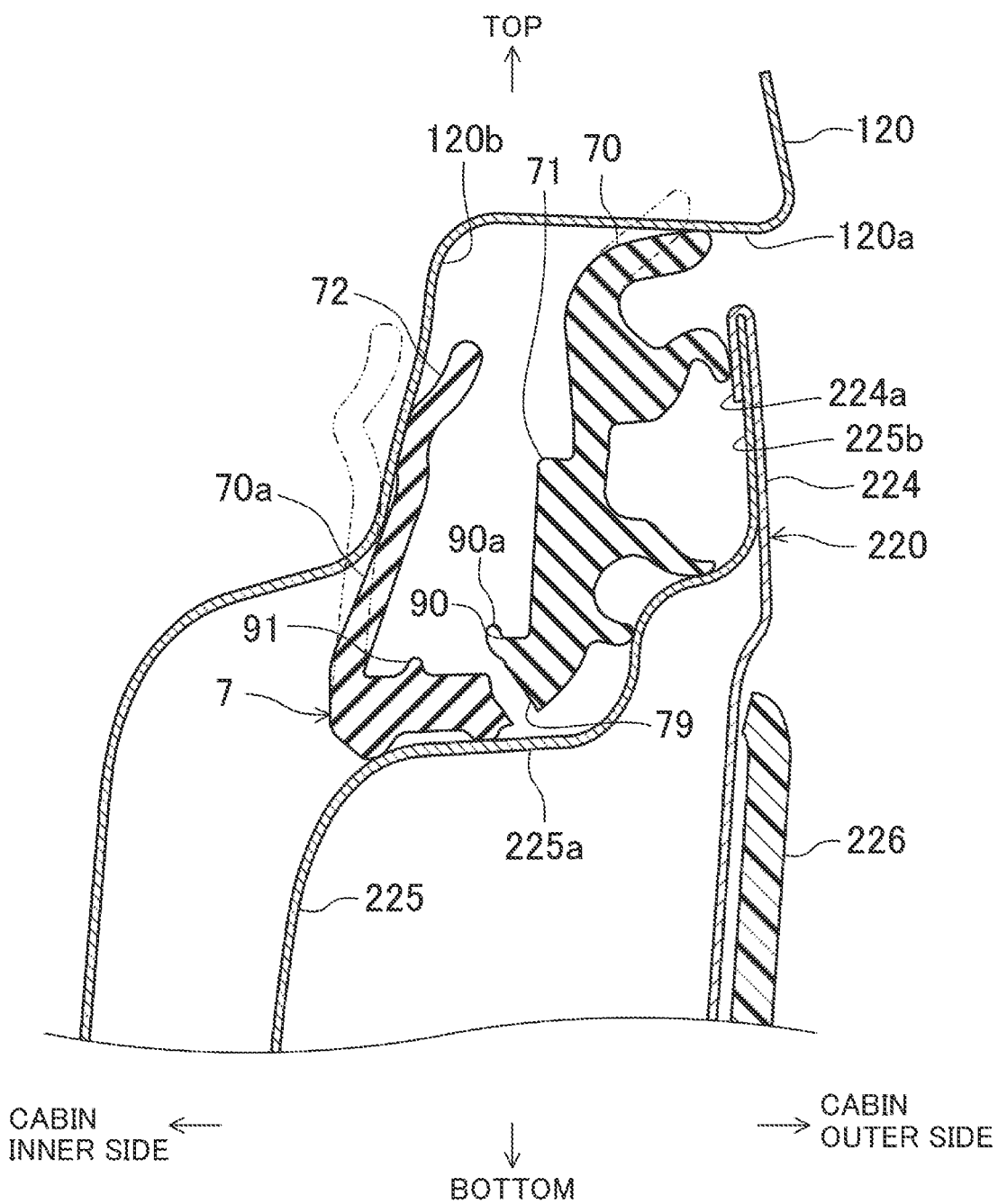
FIG. 12 is a cross-sectional view taken along line XII-XII in FIG. 5.

As illustrated by a broken line in FIG. 6, the rear die-molded portion 7 has a core removing hole 79. In molding the cylinder portion 70*a* of the rear die-molded portion 7, a core (not shown) for molding the inner surface of the cylinder portion 70*a* is necessary. By removing the core used for molding the inner surface of the cylinder portion 70*a*, the core removing hole 79 remains open forward at the outer surface of the cylinder portion 70*a*. In this embodiment, the core removing hole 79 has a slit shape elongated in the top-bottom direction, but the present disclosure is not limited to this embodiment. As illustrated in FIG. 11, the core removing hole 79 is open at the cabin outer side relative to the attachment plate 80. More specifically, the core removing hole 79 is located at the cabin outer side of the inner bead 80*a* and the outer bead 80*b* of the attachment plate 80. As illustrated in FIG. 12, the core removing hole 79 continuously extends to an upper portion of the rear die-molded portion 7.

As illustrated in FIG. 6, when the vertical side sealing portion 4 attached to the vertical side 223 of the frame 220 is seen from the rear, the vertical side sealing portion 4 tilts to approach the cabin inner side toward the top, and is gently curved. This is due to the shape in which the vertical side 223 of the frame 220 approaches the cabin inner side toward the top. Accordingly, the drain channel R5 in the vertical side sealing portion 4 tilts or curved in the same direction. The amount of water flowing into the drain channel R5 is not significantly large because water flows into the drain channel R5 while being sealed by the extruded portion outer sealing lip 35. Thus, water in the drain channel R5 flows in the cabin inner side rather than in a center portion of the drain channel R5 in the cabin inner-outer direction. Since the core removing hole 79 is formed at the cabin outer side relative to the attachment plate 80, the core removing hole 79 is open at a location where water is hardly distributed in the drain channel R5. Thus, water distributed in the drain channel R5 hardly leaks out from the core removing hole 79 even if the core removing hole 79 is not completely covered.

(Internal Structure of Rear Molded Portion 7)

As illustrated in FIGS. 7, 10, and 12, a guide portion 90 for guiding water that has flowed from the water inlet 71 toward the cabin inner side relative to the core removing hole 79 is provided on the inner surface of the rear die-molded portion 7 and located above the core removing hole 79. The guide portion 90 is integrally molded with a cabin outer side portion of the inner surface of the rear die-molded portion 7 and has a plate shape extending toward the cabin inner side. An end of the guide portion 90 at the cabin inner side is located at the cabin inner side relative to the core removing hole 79.

The guide portion 90 also extends in the front-rear direction. The front end of the guide portion 90 is located ahead of the core removing hole 79, and the rear end of the guide portion 90 is located behind the core removing hole 79. A projection 90 projecting upward and extending in the front-rear direction is formed on an end portion of the guide portion 90 at the cabin inner side. The front end of the projection 90a is integrated with the inner surface of the rear die-die-molded portion 7. On the other hand, the rear end of the projection 90a is located ahead of the rear end of the guide portion 90, and is separated from the inner surface of the rear die-molded portion 7.

As illustrated in FIGS. 10 through 12, the inner surface of the rear die-molded portion 7 is provided with a rib 91 for guiding water that has flowed from the water inlet 71 toward the cabin inner side relative to the core removing hole 79. The rib 91 extends from a position above the core removing hole 79 to a position below the upper end of the core removing hole 79. In this embodiment, the rib 91 extends to a position below the lower end of the core removing hole 79.

As illustrated in FIG. 10, the upper end of the rib 91 is located at the cabin outer side of a center portion in the cabin inner-outer direction inside the rear die-molded portion 7. The upper end of the rib 91 is located ahead of the front end of the guide portion 90. As illustrated in FIG. 12, the guide portion 90 is located above the upper end of the rib 91.

As illustrated in FIG. 11, a lower portion of the rib 91 below an upper end thereof is formed on the inner surface of the attachment plate 80, and is separated from the core removing hole 79 to the cabin inner side. A lower portion of the rib 91 below the upper end thereof extends in the top-bottom direction along the core removing hole 79.

Advantages of Embodiment

As described above, in this embodiment, when the front door 200 is closed, the extruded portion outer sealing lip 35 and the extruded portion inner sealing lip 36 of the upper side sealing portion 3 are brought into elastic contact with the roof portion 120, as illustrated in FIG. 8. At this time, since the extruded portion outer sealing lip 35 and the extruded portion inner sealing lip 36 are separated from each other in the cabin inner-outer direction to be easily deformed, a reaction force exerted on the front door 200 at the moment when the front door 200 is closed is smaller than that in a case where a sealing member having a hollow structure is brought into elastic contact. As a result, high door closability can be obtained.

In addition, when the front door 200 is closed, although the extruded portion outer sealing lip 35 and the extruded portion inner sealing lip 36 of the upper side sealing portion 3 are in elastic contact with the roof portion 120, water might enter from a gap between the extruded portion outer sealing lip 35 and the roof portion 120, as indicated by arrow W1 in FIG. 7. Water that has entered flows into the water guide groove S between the extruded portion outer sealing lip 35 and the extruded portion inner sealing lip 36. Water that has flowed into the water guide groove S flows rearward in the water guide groove S, as indicated by arrow W2. Water that has flowed rearward in the water guide groove S flows from water inlet 71 formed in an upper portion of the vertical side sealing portion 4 into the drain channel R5 formed inside the vertical side sealing portion 4, as indicated by arrow W3. As indicated by arrows W3 and W5, water that has flowed into the drain channel R5 is discharged from the drain port 82 located below the door latch device 213, and thus, is not splashed onto the door latch device 213.

In water that has flowed from a gap between the extruded portion outer sealing lip 35 and the roof portion 120, water that flows rearward in the water guide groove S reaches the guide portion 90. The guide portion 90 is located above the core removing hole 79 and extends to the cabin inner side relative to the core removing hole 79. Thus, water that has reached the guide portion 90 is guided to the cabin inner side relative to the core removing hole 79 by the guide portion 90. Accordingly, water flowing downward at the cabin outer side is not likely to flow toward the core removing hole 79 so that an outflow from the core removing hole 79 can be thereby reduced. This configuration can also reduce splash of water onto the door latch device 213.

Since the projection 90a extending in the front-rear direction is formed on the end portion of the guide portion 90 at the cabin inner side. Thus, water that was reached the upper surface of the guide portion 90 is guided in the front-rear direction by the projection 90a serving as a so-called bank. Further, since the rear end of the projection 90a is separated from the inner surface of the rear die-molded portion 7, water flows from behind the projection 90a to the cabin inner side relative to the core removing hole 79, and is not likely to reach the core removing hole 79.

In addition, since the upper side sealing portion 3 and the vertical side sealing portion 4 are integrally molded, water flowing from the water guide groove S to the drain channel R5 does not leak out on the way. This configuration can also reduce splash of water onto the door latch device 213.

Moreover, as illustrated in FIG. 10, since the upper end of the rib 91 is located at the cabin outer side of the water guide groove S, water that has flowed as indicated by arrow W6 flows at the cabin inner side relative to the rib 91, and is guided by the rib 91 to the cabin inner side relative to the core removing hole 79. Accordingly, water is less likely to flow toward the core removing hole 79, and an outflow from the core removing hole 79 can be reduced. This configuration can also reduce splash onto the door latch device 213.

The embodiment described above is merely an example in all respects, and should not be construed as limiting. Further, all modifications and changes falling within the scope of equivalency of the claims are to be embraced within the present disclosure.

INDUSTRIAL APPLICABILITY

As described above, a vehicle door sealing member according to the present disclosure is applicable to, for example, a front door and a rear door.

DESCRIPTION OF REFERENCE CHARACTERS 1 vehicle door sealing member
3 upper side sealing portion (extrusion-molded portion)
4 vertical side sealing portion
7 rear die-molded portion
35 extruded portion outer sealing lip
36 extruded portion inner sealing lip
71 water inlet
79 core removing hole
80 attachment plate
81 peripheral wall
82 drain port
90 guide portion
90a projection
91 rib
102 front door opening
200 front door
213 door latch device
220 frame
222 upper side
223 vertical side
R3 hollow portion
S water guide groove

What is claimed is:

1. A vehicle door sealing member configured to be attached to a door and to seal a gap between the door and a door opening in a side portion of a vehicle body of a vehicle, the door being configured to cover and uncover the door opening, the vehicle door sealing member comprising:
    a vertical side sealing portion including
        an attachment plate extending in a top-bottom direction along a vertical side of a window frame of the door and attached to the vertical side; and
        a peripheral wall integrally formed on the attachment plate and extending in the top-bottom direction along the vertical side of the window frame, wherein
    an upper portion of the vertical side sealing portion has a water inlet communicating with a hollow portion, the hollow portion being defined by the attachment plate and the peripheral wall,
    a lower portion of the vertical side sealing portion is located below a locked portion of the door and has a drain port communicating with the hollow portion,
    a part of the vertical side sealing portion from a part of the vertical side sealing portion having the water inlet to at least a part of the vertical side sealing portion above the hollow portion is a die-molded portion,
    the die-molded portion has a core removing hole that is open at a cabin outer side relative to the attachment plate, and
    a guide portion is disposed above the core removing hole on an inner surface of the die-molded portion, the guide portion being configured to guide water that has flowed from the water inlet toward a cabin inner side relative to the core removing hole, wherein: the guide portion also extends in a vehicle front-rear direction, a projection projecting upward and extending in the vehicle front-rear direction disposed on an end portion of the guide portion at the cabin inner side, and an end portion of the projection at a vehicle rear side is separated from the inner surface of the die-molded portion.

2. The vehicle door sealing member according to claim 1, wherein
    the guide portion is integrally molded with a cabin outer side portion on the inner surface of the die-molded portion, and extends toward the cabin inner side.

3. The vehicle door sealing member according to claim 1, wherein
    the vehicle door sealing member includes an upper side sealing portion extending in a vehicle front-rear direction along an upper side of the window frame,
    the vertical side sealing portion is integrally molded with a vehicle rear end portion of the upper side sealing portion,
    the upper side sealing portion includes an outer sealing lip and an inner sealing lip, the outer sealing lip being disposed at a cabin outer side, extending in the vehicle front-rear direction, and being configured to be brought into elastic contact with the vehicle body when the door is closed, the inner sealing lip being disposed away from the outer sealing lip toward a cabin inner side, extending in the vehicle front-rear direction, and being configured to be brought into elastic contact with the vehicle body when the door is closed,
    a water guide groove is disposed between the outer sealing lip and the inner sealing lip such that water that has entered from a gap between the outer sealing lip and the vehicle body is distributable toward a vehicle rear side, and
    the water inlet communicates with a vehicle rear side of the water guide groove.

4. A vehicle door sealing member configured to be attached to a door and to seal a gap between the door and a door opening in a side portion of a vehicle body of a vehicle, the door being configured to cover and uncover the door opening, the vehicle door sealing member comprising:
    a vertical side sealing portion including
        an attachment plate extending in a top-bottom direction along a vertical side of a window frame of the door and attached to the vertical side; and
        a peripheral wall integrally formed on the attachment plate and extending in the top-bottom direction along the vertical side of the window frame, wherein
    an upper portion of the vertical side sealing portion has a water inlet communicating with a hollow portion, the hollow portion being defined by the attachment plate and the peripheral wall,
    a lower portion of the vertical side sealing portion is located below a locked portion of the door and has a drain port communicating with the hollow portion,
    a part of the vertical side sealing portion from a part of the vertical side sealing portion having the water inlet to at least a part of the vertical side sealing portion above the hollow portion is a die-molded portion,
    the die-molded portion has a core removing hole that is open at a cabin outer side relative to the attachment plate, and
    a rib extending from a position above the core removing hole to a position below an upper end of the core removing hole is disposed on an inner surface of the die-molded portion, and is configured to guide water that has flowed from the water inlet to a cabin inner side relative to the core removing hole wherein: a guide portion also extending in a vehicle front-rear direction,
a projection projecting upward and extending in the vehicle front-rear direction disposed on an end portion of the guide portion at the cabin inner side, and an end portion of the projection at a vehicle rear side is separated from the inner surface of the die-molded portion.

5. The vehicle door sealing member according to claim 4, wherein
an upper end of the rib is located at a cabin outer side inside the die-molded portion.

6. The vehicle door sealing member according to claim 4, wherein
the core removing hole has a slit shape elongated in a top-bottom direction, and
a portion of the rib below an upper end of the core removing hole extends in the top-bottom direction along the core removing hole at a cabin inner side relative to the core removing hole.

* * * * *